United States Patent
Tan Bergström et al.

(10) Patent No.: US 11,452,019 B2
(45) Date of Patent: Sep. 20, 2022

(54) INTERWORKING BETWEEN NETWORKS OPERATING ACCORDING TO DIFFERENT RADIO ACCESS TECHNOLOGIES

(71) Applicant: TELEFONAKTIEBOLAGET LM ERICSSON (PUBL), Stockholm (SE)

(72) Inventors: Mattias Tan Bergström, Stockholm (SE); Tomas Hedberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 496 days.

(21) Appl. No.: 15/117,702

(22) PCT Filed: Jan. 22, 2015

(86) PCT No.: PCT/SE2015/050058
§ 371 (c)(1),
(2) Date: Aug. 9, 2016

(87) PCT Pub. No.: WO2015/119557
PCT Pub. Date: Aug. 13, 2015

(65) Prior Publication Data
US 2017/0013516 A1    Jan. 12, 2017

Related U.S. Application Data

(60) Provisional application No. 61/937,729, filed on Feb. 10, 2014.

(51) Int. Cl.
*H04W 36/00* (2009.01)
*H04W 36/22* (2009.01)
(Continued)

(52) U.S. Cl.
CPC ....... *H04W 36/22* (2013.01); *H04W 36/0069* (2018.08); *H04W 76/27* (2018.02);
(Continued)

(58) Field of Classification Search
CPC .................................................... H04W 36/00
See application file for complete search history.

(56) References Cited

U.S. PATENT DOCUMENTS 8,792,895 B2 * 7/2014 Huang .............. H04W 36/0027
455/436
9,049,626 B2 * 6/2015 Rexhepi ............ H04W 36/0022
(Continued)

FOREIGN PATENT DOCUMENTS

EP         2 046 085 A1    4/2009
WO        2012016598 A1    2/2012
(Continued)

OTHER PUBLICATIONS

European Search Report dated Jan. 26, 2017, issued in Application No. 15746591.5, 3 pages.
(Continued)

*Primary Examiner* — Michael T Vu
(74) *Attorney, Agent, or Firm* — Rothwell, Figg, Ernst & Manbeck, P.C.

(57) ABSTRACT

There is provided a method of operating a network node in a first network that is operating according to a first radio access technology, RAT, the network node controlling a first cell in the first network, the method comprising receiving information for a terminal device served by the first cell (913; 1113), the received information corresponding to information for the terminal device that was provided to the terminal device from another cell of the first network, the information being for use in a network interworking feature that enables and controls interworking between the first network and a network operating according to a second RAT.

30 Claims, 7 Drawing Sheets

(51) Int. Cl.
*H04W 76/27* (2018.01)
*H04W 88/06* (2009.01)
*H04W 92/20* (2009.01)
*H04W 48/20* (2009.01)
*H04W 36/14* (2009.01)
*H04W 84/04* (2009.01)
*H04W 84/12* (2009.01)

(52) U.S. Cl.
CPC .......... *H04W 36/14* (2013.01); *H04W 48/20* (2013.01); *H04W 84/042* (2013.01); *H04W 84/12* (2013.01); *H04W 88/06* (2013.01); *H04W 92/20* (2013.01)

(56) References Cited

U.S. PATENT DOCUMENTS

| | | | |
|---|---|---|---|
| 9,344,939 B2* | 5/2016 | Sirotkin | H04W 36/16 |
| 2009/0253426 A1 | 10/2009 | Qiu et al. | |
| 2010/0067375 A1 | 3/2010 | Ianev | |
| 2011/0103347 A1* | 5/2011 | Dimou | H04W 36/0016 370/331 |
| 2013/0003698 A1* | 1/2013 | Olvera-Hernandez | H04W 8/082 370/331 |
| 2013/0044709 A1* | 2/2013 | Adjakple | H04W 76/025 370/329 |
| 2013/0183975 A1* | 7/2013 | Hyun | H04W 36/22 455/436 |
| 2014/0029570 A1 | 1/2014 | Lee et al. | |
| 2015/0031367 A1* | 1/2015 | Singh | H04W 36/08 455/437 |
| 2015/0103657 A1* | 4/2015 | Henderson | H04W 36/0083 370/232 |
| 2015/0373603 A1* | 12/2015 | Jung | H04W 36/22 370/331 |

FOREIGN PATENT DOCUMENTS

| | | |
|---|---|---|
| WO | 2013036580 A2 | 3/2013 |
| WO | 2013052805 A1 | 4/2013 |
| WO | 2014005654 A1 | 1/2014 |
| WO | 2014016280 A1 | 1/2014 |
| WO | 2014166728 A1 | 10/2014 |
| WO | 2014182010 A1 | 11/2014 |

OTHER PUBLICATIONS

International Search Report and Written Opinion dated Apr. 29, 2015, in International Application No. PCT/SE2015/050058, 11 pages.

Ericsson et al., "WLAN/3GPP Radio Interworking—More on Idle and Connected mode", 3GPP TSG-RAN WG2 #82, Tdoc R2-131886, Fukuoka, Japan, May 20-24, 2013. (10 pages).

European Patent Office Communication dated Mar. 24, 2020 issued in European Patent Application No. 18178704.5. (7 pages).

\* cited by examiner

INTERWORKING BETWEEN NETWORKS OPERATING ACCORDING TO DIFFERENT RADIO ACCESS TECHNOLOGIES

CROSS REFERENCE TO RELATED APPLICATION(S)

This application is a 35 U.S.C. § 371 National Phase Entry Application from PCT/SE2015/050058, filed Jan. 22, 2015, designating the United States, and also claims the benefit of U.S. Provisional Application No. 61/937,729, filed Feb. 10, 2014. The disclosures of both applications are incorporated herein in their entirety by reference.

TECHNICAL FIELD

The present disclosure relates generally to wireless communication systems and is more particularly related to techniques for managing information required for operating a terminal device with respect to networks operating according to different radio access technologies, RATs, such as a wide area communication technology standardised by the $3^{rd}$ Generation Partnership Project (3GPP) and a wireless local area network (WLAN) technology.

BACKGROUND

The wireless local-area network (WLAN) technology known as "Wi-Fi" has been standardised by IEEE in the 802.11 series of specifications (i.e., as "*IEEE Standard for Information technology—Telecommunications and information exchange between systems. Local and metropolitan area networks—Specific requirements. Part 11: Wireless LAN Medium Access Control (MAC) and Physical Layer (PHY) Specifications*"). As currently specified, Wi-Fi systems are primarily operated in the 2.4 GHz and 5 GHz bands. The terms "Wi-Fi" and "WLAN" are used interchangeably throughout this application.

The IEEE 802.11 specifications regulate the functions and operations of the Wi-Fi access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardised by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), High Speed Packet Access (HSPA) and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network (CN) and provide the same or overlapping services. The term "Wi-Fi offload" is commonly used in the efforts to standardise the integration of Wi-Fi to the cellular network and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

Many of today's portable terminal devices (also referred to herein as "user equipments" or "UEs" or mobile devices or communication devices) support Wi-Fi in addition to one or several 3GPP cellular technologies. In many cases, however, these terminal devices essentially behave as two separate devices from a radio access perspective.

3GPP is currently working on specifying a feature or mechanism for WLAN/3GPP radio interworking which improves the control over how a terminal device (UE) steers traffic (e.g. data sessions, voice calls, etc.) between 3GPP radio access networks, RANs (i.e. cellular radio access networks operating according to a 3GPP-specified radio access technology) and WLANs belonging to the operator or its partners.

In this and related mechanisms, the RAN (e.g. the 3GPP-specified RAN or the WLAN RAN) should provide parameters to the terminal device which are used to perform 'access selection' (or 'access network selection') to decide which network (e.g. the 3GPP network or WLAN) the terminal device should connect to. When access selection has been completed there may be 'traffic steering' in which it is decided which traffic (e.g. which data sessions, etc.) should be routed over the 3GPP network and which should be routed over the WLAN.

In some examples of these mechanisms, the 3GPP RAN can provide thresholds to the terminal devices, including an LTE reference signal received power (RSRP) and/or a WLAN received channel power indicator (RCPI), etc, and a terminal device could be configured to connect to a WLAN if the LTE RSRP is below the signalled RSRP threshold at the same time that the WLAN RCPI is above the signalled RCPI threshold. 3GPP has also discussed that similar thresholds can be provided for steering traffic back from WLAN to a 3GPP network.

It has also been discussed that the 3GPP RAN (or some other part of the 3GPP, such as a network node like a mobility management entity, MME) should indicate traffic steering information to the terminal device that indicates to the terminal device, for example, which traffic can/should be routed over WLAN and which traffic can/should be routed over a 3GPP network. The traffic steering information can take different forms. One type of traffic steering information can indicate that traffic with specific quality of service (QoS) characteristics should be handled in a certain way, for example by moving or not moving it to WLAN. One example applicable to LTE (at least) is that the traffic steering information can indicate that the terminal device shall not steer traffic with a QoS Class Identifier (QCI) value 5 (and associated traffic, e.g. based on IP address) to WLAN, or that traffic with a QCI value of 10-255 should be moved to WLAN. Another example is that the traffic steering information can indicate to the terminal device that traffic in a specific bearer should or should not be moved to WLAN. The traffic steering information can also indicate times at which certain types of traffic can or cannot be steered over certain types of RAT (e.g. between 1330 and 1500 voice traffic should be steered over 3GPP only).

Traffic steering information may be set for a specific UE, for groups of UEs, or be common for all UEs served by a network node. Traffic steering information may be sent to terminal devices as broadcast or dedicated signalling. Dedicated signalling is normally kept for some time, because it typically is best adapted to the receiving UE and signalling load is reduced if information is kept until changed.

SUMMARY

According to some proposals for the WLAN/3GPP interworking mechanism, a terminal device can receive traffic steering information from nodes, such as base stations. During, for example, a handover from one base station to another, the terminal device would retain the dedicated traffic steering information it has received from the first node when entering (i.e. starting to be served by) the second node. However the traffic steering information provided to the terminal device by the first node may not be suitable for the terminal device to use when it is connected to (served by) the second node. For example, the first node may have provided traffic steering information to the terminal device which controls the terminal device to move all non-voice traffic to WLAN. Although this may have been suitable when the terminal device is being served by the first network node, it may be more suitable to keep all traffic in 3GPP (i.e. not move any traffic to WLAN) when being served by the second node. The use of traffic steering information from a previous serving node may therefore result in a terminal device offloading traffic to WLAN which actually should have been served in 3GPP, and vice versa.

In view of this problem, the present disclosure provides techniques to ensure that the traffic steering information provided to or otherwise applicable to a terminal device is made known to the network node (in particular a node in a cellular network, such as a 3GPP network, rather than a WLAN node) which currently serves the terminal device.

In some embodiments the transfer of traffic steering information is achieved by the source base station (i.e. the base station in the cell that was previously serving the terminal device) forwarding the traffic steering information to a target base station (the base station in the cell that is now serving the terminal device) during or following a handover. In other embodiments, the terminal device provides the traffic steering information to the target base station during or following a handover to the target base station.

In further embodiments, mechanisms are described that allow the target base station to acknowledge that the traffic steering information maintained by or applicable to a terminal device is suitable for the terminal device to use when the terminal device is being served by the target base station.

It will be appreciated that in addition to use during or following handover from one base station to another, the above embodiments can also be used when the terminal device transitions from an idle state to a connected state.

According to a first specific embodiment, there is provided a method of operating a network node in a first network that is operating according to a first radio access technology, RAT, the network node controlling a first cell in the first network, the method comprising receiving information for a terminal device served by the first cell, the received information corresponding to information for the terminal device that was provided to the terminal device from another cell of the first network, the information being for use in a network interworking feature that enables and controls interworking between the first network and a network operating according to a second RAT.

According to a second specific embodiment, there is provided a network node for use in a first network that is operating according to a first radio access technology, RAT, the network node supporting a network interworking feature that enables and controls interworking between the first network and a network operating according to a second RAT, the network node controlling a first cell in the first network, the network node comprising a processing circuit and interface circuitry that are configured to receive information for a terminal device served by the first cell, the received information corresponding to information for the terminal device that was provided to the terminal device from another cell of the first network, the information being for use in the network interworking feature.

According to a third specific embodiment, there is provided a method of operating a network node in a first network that is operating according to a first radio access technology, RAT, the network node controlling a second cell in the first network, the method comprising sending information for a terminal device that was used in the second cell to a network node controlling a first cell, the information being for use in a network interworking feature that enables and controls interworking between the first network and a network operating according to a second RAT.

According to a fourth specific embodiment, there is provided a network node for use in a first network that is operating according to a first radio access technology, RAT, the network node supporting a network interworking feature that enables and controls interworking between the first network and a network operating according to a second RAT, the network node controlling a second cell in the first network, the network node comprising a processing circuit and interface circuitry that are configured to send information for a terminal device that was used in the second cell to a network node controlling a first cell, the information being for use in the network interworking feature.

According to a fifth specific embodiment, there is provided a method of operating a terminal device in a first network that is operating according to a first radio access technology, RAT, the terminal device supporting and operating according to a network interworking feature that enables and controls interworking between the first network and a network operating according to a second RAT, the method comprising sending information for the terminal device to a network node controlling a first cell in the first network, the information having been previously used by the terminal device in another cell in the first network, the information being for use in the network interworking feature.

According to a sixth specific embodiment, there is provided a terminal device for use in a first network that is operating according to a first radio access technology, RAT, the terminal device supporting and operating according to a network interworking feature that enables and controls interworking between the first network and a network operating according to a second RAT, the terminal device comprising a processing circuit and transceiver circuitry that are configured to send information for the terminal device to a network node controlling a first cell in the first network, the information having been previously used by the terminal device in another cell in the first network, the information being for use in the network interworking feature.

According to a seventh specific embodiment, there is provided a computer program product having computer readable code embodied therein, the computer readable code being configured such that, on execution by a suitable processing circuit or computer, the processing circuit or computer is caused to perform any of the method embodiments described above.

In any of the embodiments described above, the information that is for use in the network interworking feature can be traffic steering information. Traffic steering information is information that is used to tell a terminal device, or enable a terminal device to decide, which traffic should be routed over different types of RAT. Alternatively or in addition, the information that is for use in the network interworking feature can be access selection information. Access selection information is used by the terminal device in access network selection (i.e. the selection of a network or RAT to use), and can comprise parameters or thresholds.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
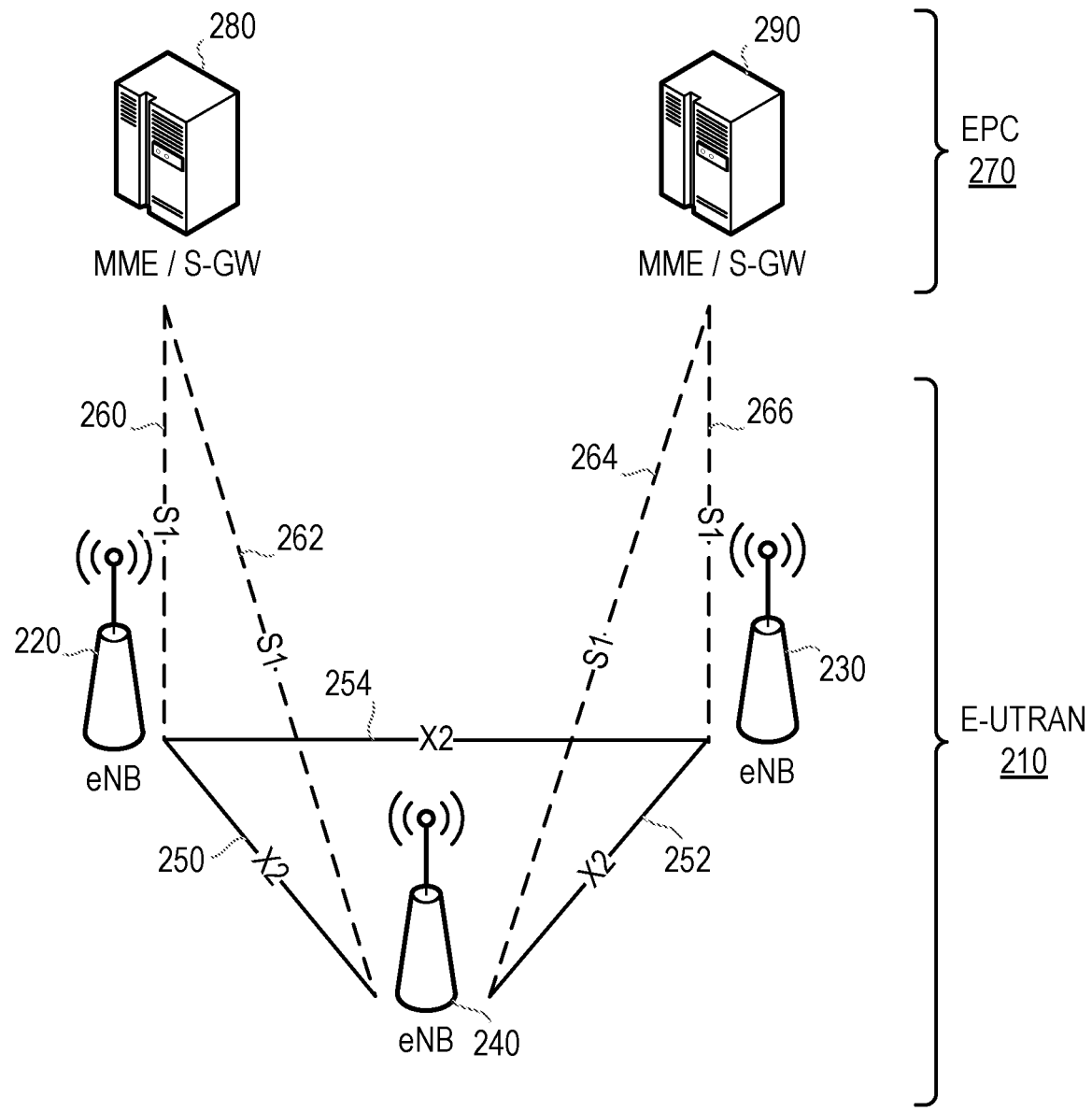
FIG. 1 is a diagram illustrating the overall architecture of an LTE network.

In the discussion that follows, specific details of particular embodiments of the present teaching are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application-specific integrated circuits (ASICs), programmable logic arrays (PLAs), digital signal processors (DSPs), reduced instruction set processors, field programmable gate arrays (FPGAs), state machines capable of performing such functions, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present teachings may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "terminal devices", although other generally equivalent terms such as "mobile devices", "communication devices", "mobile stations" and particularly "UEs"—which is a 3GPP term for end user wireless devices—are also used. It should be appreciated, however, that the techniques and apparatus described herein are not limited to 3GPP UEs (i.e. UEs or terminal devices that are capable of operating according to one or more 3GPP standardised technologies), but are more generally applicable to end user wireless devices (e.g., portable cellular telephones, smartphones, wireless-enabled tablet computers, etc.) that are useable in cellular systems and that are capable of communicating with a radio access network (RAN) using one or multiple carriers or cells (e.g. known as a carrier aggregation (CA) mode in LTE). It should also be noted that the current disclosure relates to end user terminal devices that support both a wide-area cellular technology, such as any of the wide-area radio access standards maintained by 3GPP, and a wireless local area network (WLAN) technology, such as one or more of the IEEE 802.11 standards. End user devices are referred to in Wi-Fi document as "stations," or "STA"—it should be appreciated that the term "UE" or "terminal device" as used herein should be understood to refer to a STA, and vice-versa, unless the context clearly indicates otherwise. It should also be noted that the current disclosure also relates to end user wireless devices that support both a wide-area cellular technology, such as any of the wide-area radio access standards maintained by 3GPP, and a non-3GPP standardized RAT, for which improvements to the selection of the access network and traffic steering are desired.

As used herein, a "base station" comprises in a general sense any node transmitting radio signals in the downlink (DL) to a terminal device and/or receiving radio signals in the uplink (UL) from the terminal device. Some example base stations are eNodeB, eNB, Node B, macro-/micro-/pico-/femto-cell radio base station, home eNodeB (also known as a femtocell base station), relay, repeater, sensor, transmitting-only radio nodes or receiving-only radio nodes. A base station may operate or at least perform measurements in one or more frequencies, carrier frequencies or frequency bands and may itself be capable of carrier aggregation. It may also be a single-radio access technology (RAT), multi-RAT, or multi-standard node, e.g., using the same or different base band modules for different RATs.

The signalling between the terminal devices and the network nodes (e.g. a base station or another node in the RAN or core network) described below is either via direct links or logical links (e.g. via higher layer protocols and/or via one or more other network nodes). For example, signalling from a coordinating node may pass another network node, e.g., a radio node.

Overall E-UTRAN architecture—An exemplary Evolved UMTS (Universal Mobile Telecommunications System) Terrestrial Radio Access Network (E-UTRAN) architecture is shown in FIG. 1. The E-UTRAN architecture 210 consists of base stations 220, 230, 240 called enhanced NodeBs (eNBs or eNodeBs), which provide the E-UTRA user plane and control plane protocol terminations towards the User Equipment (UE). The eNBs 220, 230, 240 are interconnected with each other by means of the X2 interface 250, 252, 254. The eNBs 220, 230, 240 are also connected by means of the S1 interface 260, 262, 264, 266 to the EPC 270 (Evolved Packet Core), more specifically to the MME 280, 290 (Mobility Management Entity), by means of the S1-MME interface, and to the Serving Gateway 280, 290 (S-GW) by means of the S1-U interface. The S1 interface supports many-to-many relations between MMEs/S-GWs and eNBs.

The eNB 220, 230, 240 hosts functionalities such as Radio Resource Management (RRM), radio bearer control, admission control, header compression of user plane data towards the UE, and routing of user plane data towards the serving gateway. The MME 280, 290 is the control node that processes the signalling between the UE and the core network 270. The main functions of the MME 280, 290 are related to connection management and bearer management, which are handled via Non Access Stratum (NAS) protocols. The S-GW 280, 290 is the anchor point for UE mobility, and also includes other functionalities such as temporary downlink data buffering while the UE is being paged, packet routing and forwarding the right eNB 220, 230, 240, gathering of information for charging and lawful interception. The PDN (Packet Data Network) Gateway (P-GW—not shown in FIG. 1) is the node responsible for UE IP address allocation, as well as Quality of Service (QoS) enforcement. The 3GPP document "Evolved Universal Terrestrial Radio Access (E-UTRA) and Evolved Universal Terrestrial Radio Access Network (E-UTRAN); Overall Description; Stage 2," 3GPP TS 36.300, v. 11.3.0 (September 2012), available at www.3gpp.org, and the references therein provide details of the functionalities of the different nodes shown in FIG. 1.

Figure 2:
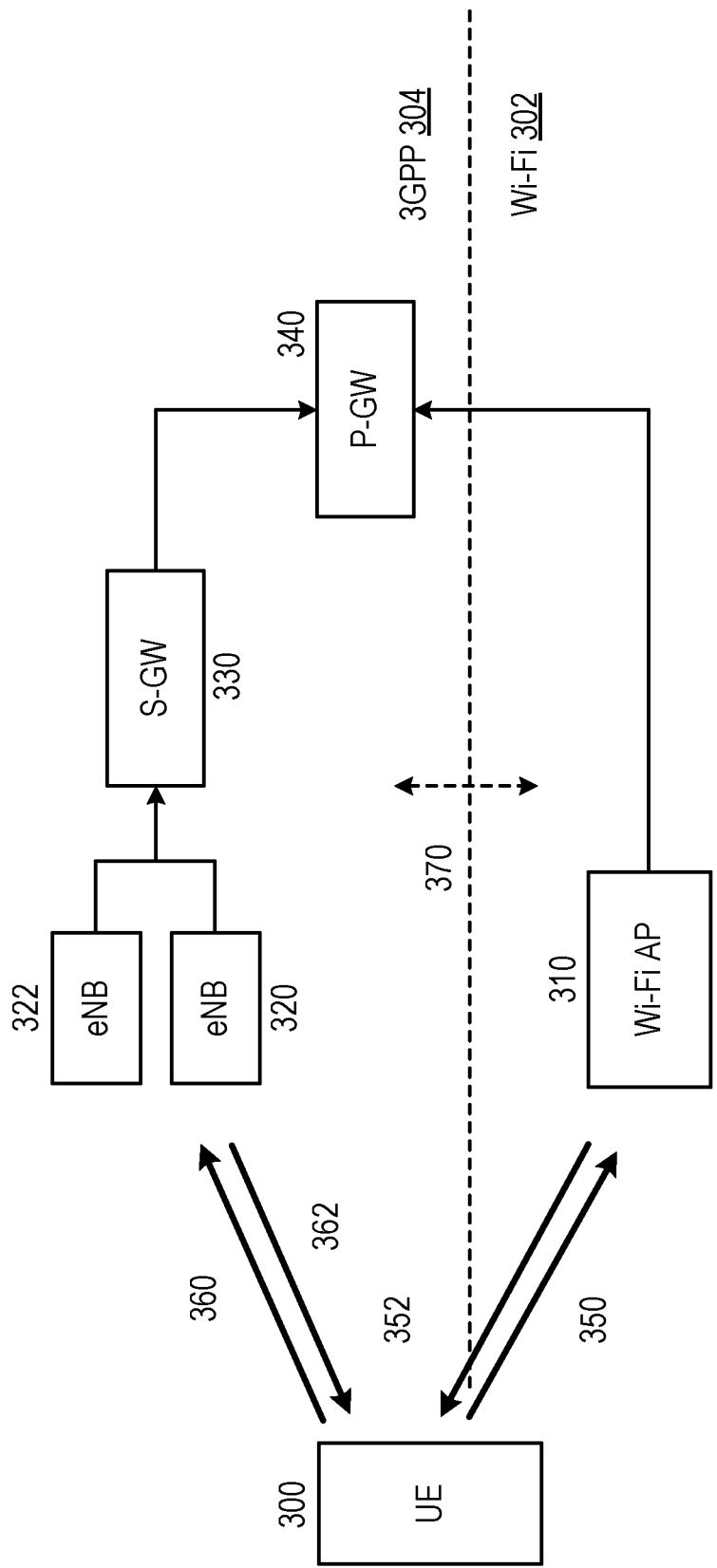
FIG. 2 illustrates part of a LTE network and a W-Fi network.

FIG. 2 illustrates a network where the LTE radio access parts (eNBs) 320, 322 and a Wi-Fi wireless access point 310 are both connected to the same P-GW 340. In the case of the LTE radio access parts, the eNBs 320, 322 are connected to the P-GW 340 via an S-GW 330. A UE 300 is shown that is capable of being served both from the Wi-Fi Access Point 310 and the LTE eNBs 320, 322. Arrows 350 and 352 illustrate the uplink (UL) and downlink (DL) transmissions between the UE 300 and the Wi-Fi AP 310 respectively and arrows 360 and 362 illustrate the uplink (UL) and downlink (DL) transmissions between the UE 300 and the eNBs respectively. FIG. 2 illustrates one possible way of connecting a Wi-Fi access network 302 to the same core network as the 3GPP-specified access network 304. The gateways (Trusted Wireless Access Gateway, TWAG, evolved Packet Data Gateway, ePDG, etc) between Wi-Fi AP and P-GW are omitted for simplicity. It should be noted that the presently disclosed techniques are not restricted to scenarios where the Wi-Fi access network 302 is connected in this way; the techniques can be applied to scenarios where the networks are more or completely separate.

In the following description of the various solutions provided by the present disclosure, the arrangement shown in FIG. 2 is used as a basis for the explanation, and references in the description below to a terminal device/UE, base station/eNB, 3GPP network/RAN/RAT, Wi-Fi AP and WLAN are to the UE 300, eNB 320, 3GPP network/RAN/RAT 304, Wi-Fi AP 310 and WLAN 302 shown in FIG. 2 respectively. However, it will be appreciated that the various solutions provided by the present disclosure are not limited to implementation in the arrangement shown in FIG. 2.

Figure 3:
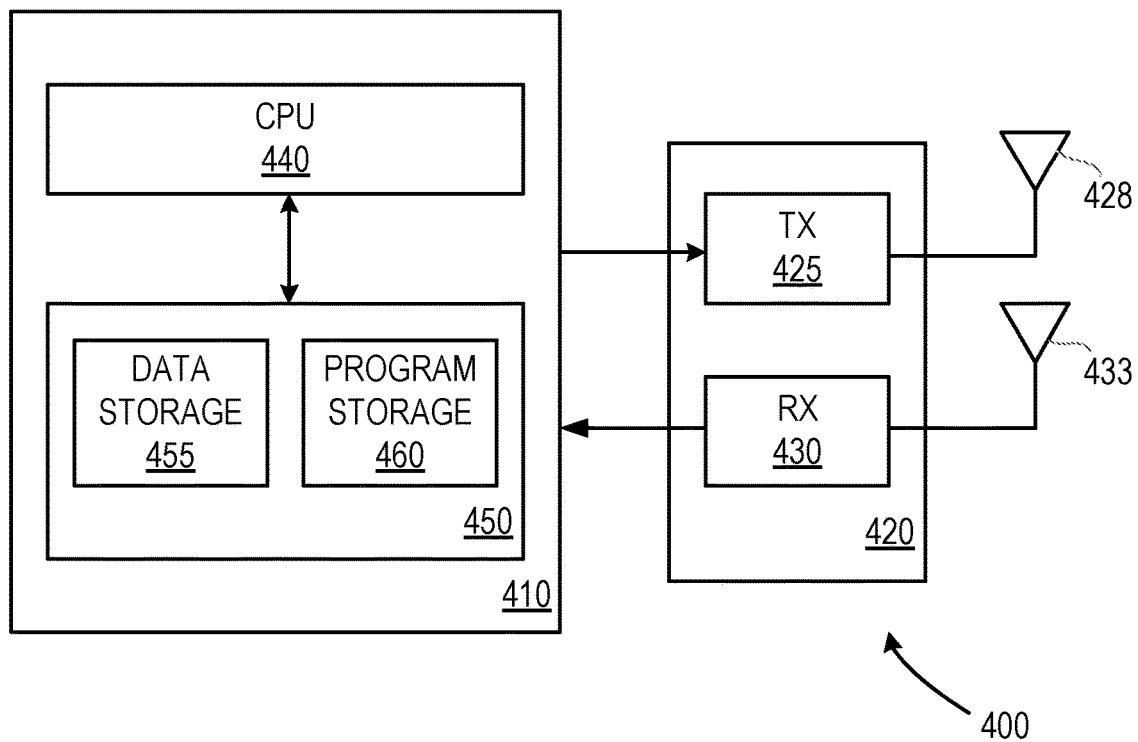
FIG. 3 is a block diagram of an exemplary terminal device according to several embodiments.

Hardware Implementations—Several of the techniques and methods described above may be implemented using radio circuitry and electronic data processing circuitry provided in a terminal device. FIG. 3 illustrates features of an example terminal device 400 according to several embodiments. Terminal device 400, which may be a UE configured for operation with an LTE network (E-UTRAN) and that also supports Wi-Fi, for example, comprises a transceiver unit 420 for communicating with one or more base stations (eNBs) as well as a processing circuit 410 for processing the signals transmitted and received by the transceiver unit 420. Transceiver unit 420 includes a transmitter 425 coupled to one or more transmit antennas 428 and receiver 430 coupled to one or more receiver antennas 433. The same antenna(s) 428 and 433 may be used for both transmission and reception. Receiver 430 and transmitter 425 use known radio processing and signal processing components and techniques, typically according to a particular telecommunications standard such as the 3GPP standards for LTE. Note also that transmitter unit 420 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques described herein, additional details are not shown here.

Processing circuit 410 comprises one or more processors 440 coupled to one or more memory devices 450 that make up a data storage memory 455 and a program storage memory 460. Processor 440, identified as CPU 440 in FIG. 3, may be a microprocessor, microcontroller, or digital signal processor, in some embodiments. More generally, processing circuit 410 may comprise a processor/firmware combination, or specialized digital hardware, or a combination thereof. Memory 450 may comprise one or several types of memory such as read-only memory (ROM), random-access memory, cache memory, flash memory devices, optical storage devices, etc. Because terminal device 400 supports multiple radio access technologies, processing circuit 410 may include separate processing resources dedicated to one or several radio access technologies, in some embodiments. Again, because the various details and engineering tradeoffs associated with the design of baseband processing circuitry for mobile devices are well known and are unnecessary to a full understanding of the techniques described herein, additional details are not shown here.

Typical functions of the processing circuit 410 include modulation and coding of transmitted signals and the demodulation and decoding of received signals. In several embodiments, processing circuit 410 is adapted, using suitable program code stored in program storage memory 460, for example, to carry out any of the embodiments described below. Of course, it will be appreciated that not all of the steps of these embodiments are necessarily performed in a single microprocessor or even in a single module.

Figure 4:
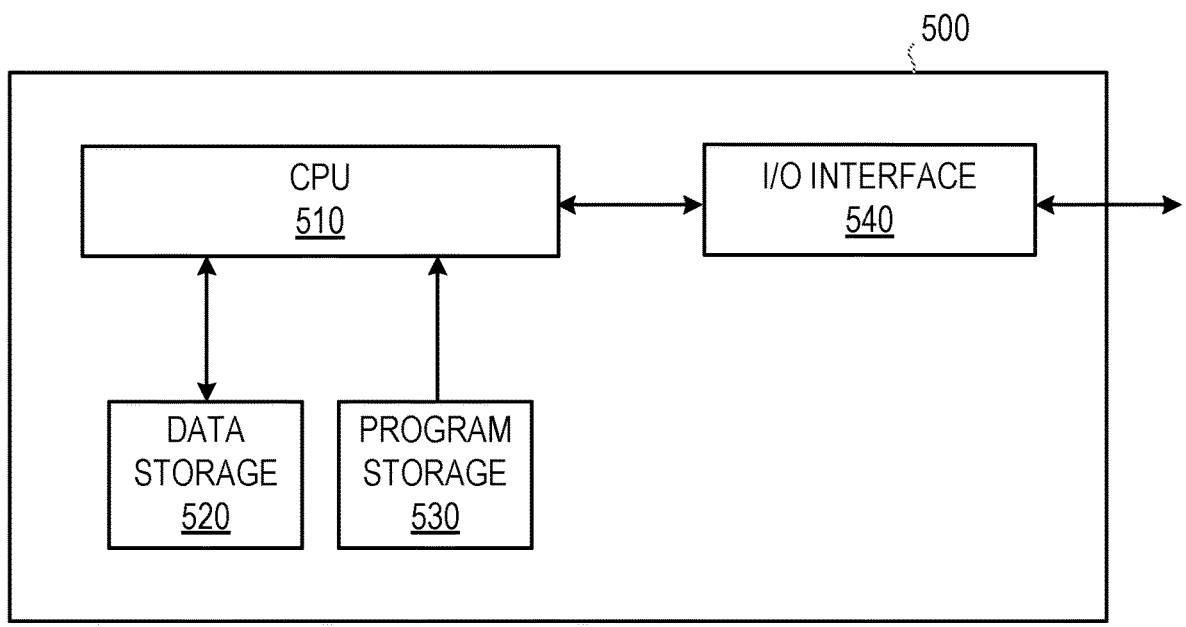
FIG. 4 is a block diagram of an exemplary network node according to several embodiments.

Similarly, several of the techniques and processes described above can be implemented in a network node, such as an eNodeB or other node in a 3GPP network. FIG. 4 is a schematic illustration of a node 500 in which a method embodying any of the presently described network-based techniques can be implemented. A computer program for controlling the node 500 to carry out a method according to any of the relevant embodiments is stored in a program storage 530, which comprises one or several memory devices. Data used during the performance of a method according to the embodiments is stored in a data storage 520, which also comprises one or more memory devices. During performance of a method embodying the present techniques, program steps are fetched from the program storage 530 and executed by a Central Processing Unit (CPU) 510, retrieving data as required from the data storage 520. Output information resulting from performance of a method embodying the presently-described techniques can be stored back in the data storage 520, or sent to an Input/Output (I/O) interface 540, which includes a network interface for sending and receiving data to and from other network nodes and which may also include a radio transceiver for communicating with one or more terminal devices.

Accordingly, in various embodiments, processing circuits, such as the CPU 510 in FIG. 4, are configured to carry out one or more of the techniques described in detail below. Likewise, other embodiments include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

As noted above, the teaching of the present disclosure relates to ways in which traffic steering information provided to a terminal device by a first network node (e.g. base station) for use in that cell is made known to a second network node when the terminal device is being served by (or is shortly to be served by) the second network node.

Although the teaching of the present disclosure is presented in terms of traffic steering information, it will be appreciated by those skilled in the art that the teachings can also or alternatively be used to make other information used in a network interworking feature known to a second network node. Such other information can include information used in access network selection, such as parameters or thresholds.

As used herein, the term "traffic steering information" covers information that is used to tell a terminal device, or enable a terminal device to decide, which traffic should be routed over different types of RAT. The traffic steering information is for use in a network interworking feature that enables and controls interworking between a first network (of which the network node is a part) that is operating according to a first RAT, such as a 3GPP-standardised or other cellular RAT and a network operating according to a second (different) RAT, such as a WLAN.

As described above, the information used in access selection can comprise parameters or thresholds which are used by the terminal device in a network interworking feature to perform 'access selection' to decide which network (e.g. the 3GPP network or WLAN) the terminal device should connect to. For example the parameters or thresholds can comprise an LTE reference signal received power (RSRP) and/or a WLAN received channel power indicator (RCPI), etc.

Figure 5:
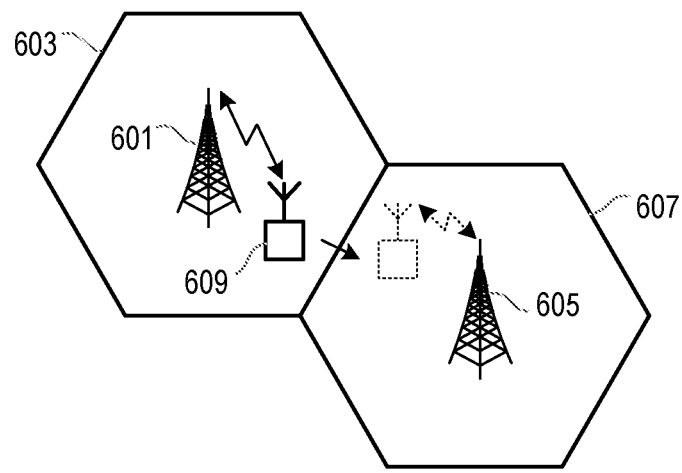
FIG. 5 illustrates the handover of a terminal device from a first cell to a second cell.

In some embodiments, the traffic steering information is acquired by a network node (e.g. base station) during or following a handover procedure. The handover scenario is illustrated in FIG. 5. A base station 601 (e.g. an eNB) has a coverage area 603 referred to as the 'source' or 'first' base station/cell, and base station 605 has a coverage area 607 referred to as the 'target' or 'second' base station/cell. Both base stations operate according to a cellular communication technology, such as any of the 3GPP-standardised radio-access technologies, including Long-Term Evolution (LTE), Universal Mobile Telecommunications System (UMTS)/ Wideband Code-Division Multiple Access (WCDMA), High Speed Packet Access (HSPA) and Global System for Mobile Communications (GSM).

A terminal device 609 is initially located in (and served by) the source cell 603. If the terminal device 609 subsequently moves into the coverage area 607 of the second base station 605 (indicated by the arrow), a handover of the terminal device 609 to the target base station 605 from the source base station 601 will be triggered.

As noted above, in some embodiments the traffic steering information is acquired by a network node (e.g. base station) when a terminal device being served by the network node transitions from an idle state to a connected state. For example if a terminal device is moving through the coverage area of a number of cells while in an idle mode or state (e.g. RRC IDLE in LTE) then the terminal device may not have received any traffic steering information from the cells it has been served by while being in the idle mode or state. This means that the terminal device may still have and use the traffic steering information from the base station/cell where it was last in the connected mode or state (e.g. RRC CONNECTED in LTE). This scenario is illustrated in FIG. 6.

Figure 6:
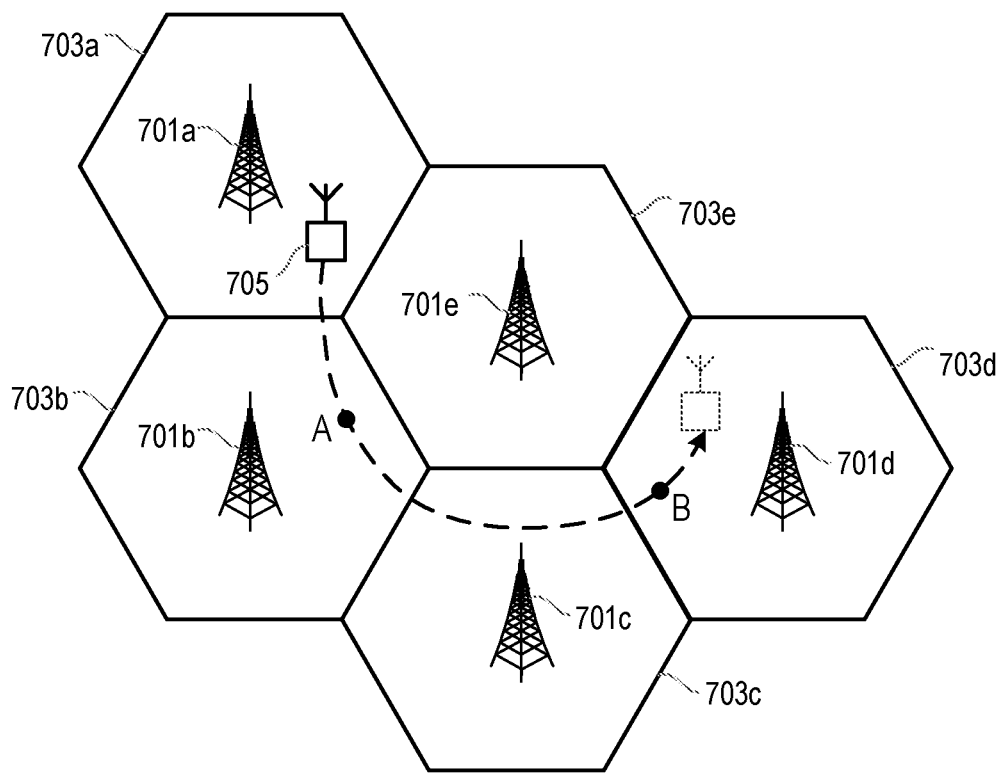
FIG. 6 illustrates the movement of a terminal device through a number of cells.

Five base stations 701a-e are illustrated in FIG. 6, each defining a respective cell 703a-e. A terminal device 705 is initially in cell 703a and moves to cell 703b. The terminal device 705 will have received traffic steering information from either of cells 703a or 703b. While the terminal device is in cell 703b it enters an idle mode or state, denoted by location A, for example due to a traffic flow (e.g. data session) ending. The terminal device 705 then moves from cell 703b through cell 703c and 703d while in the idle mode.

At a location B in cell 703d, the terminal device 705 again enters a connected mode (for example if a data session is to start). At this point the base station 701d of cell 703d can acquire the traffic steering information for the terminal device 705 according to some embodiments described herein.

It will also be appreciated that when a terminal device transitions from an idle mode to a connected mode and connects to a base station, the terminal device may not have moved to a new cell during the period in which the terminal device was in the idle mode. In this case the terminal device may be connected to the same network node that is was connected to when it was last in the connected mode. In the example of FIG. 6, a terminal device 705 is initially connected to cell 703b and when the traffic flow ends the terminal device 705 is triggered to enter an idle mode. If a new traffic flow needs to start while the terminal device 705 is in the coverage of cell 703b, the terminal device 705 would again enter connected mode and connect to cell 703b. As base station 701b may have discarded the traffic steering information for the terminal device 705 when the terminal device 705 entered the idle mode, the embodiments described herein can also be applied to this scenario in order for the base station 701b to acquire the traffic steering information. As evident above, the terms 'cell' and 'base station' are in some cases used interchangeably herein. However, it will be appreciated that one base station can serve multiple cells. The cells of a base station can be collocated or in some cases non-collocated. A terminal device may not be able to know which base station a cell belongs to. Hence where it is herein stated that a terminal device receives information from or transmits information to a base station, this can also be understood as the terminal device receiving information from or transmitting information to a cell.

Although the description of the embodiments herein focuses primarily on LTE, it will be appreciated that the embodiments can also be applied to other RATs (Radio Access Technologies). In WCDMA, the handover information is sent between a Source serving radio network controller (SRNC) and a Target SRNC instead of between base stations. In WCDMA the Cell_DCH state corresponds to the LTE RRC CONNECTED state. WCDMA also has Cell_FACH, Cell_PCH and URA_PCH states (which, although not technically 'idle' states, are considered as such for the purposes of this disclosure, and a transition from one of these states to a Cell_DCH state can trigger the sending of the traffic steering information to the network node). In these states the terminal device performs CELL UPDATE (for Cell_FACH and Cell_PCH states) or URA UPDATE (for URA_PCH state) signalling. These signalling procedures invoke a context fetch, which results in a similar context transfer as for handover. In the home NodeB (HNodeB) architecture of WCDMA, a similar transfer takes place between source and target Serving HNodeBs.

Forwarding Traffic Steering Information between Nodes

In some embodiments of the techniques described herein, the traffic steering information for a terminal device is sent from one base station (that was previously serving the terminal device) to the base station currently serving the terminal device.

Figure 7:
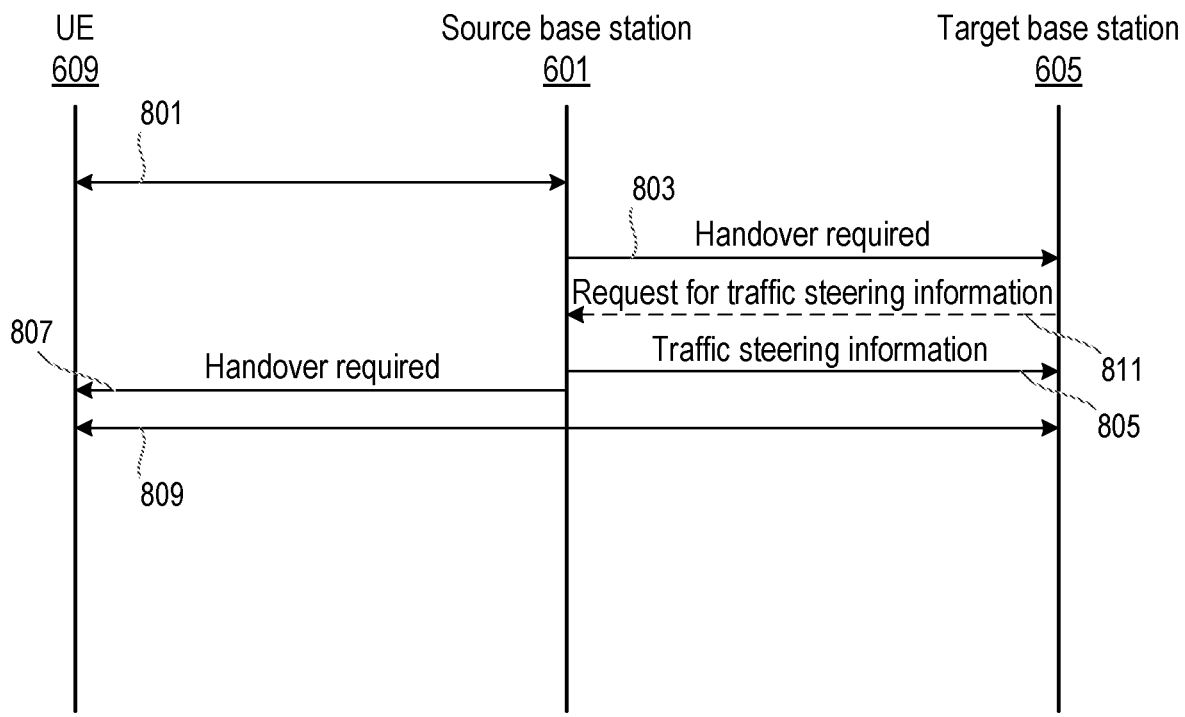
FIG. 7 is a signalling diagram illustrating the signalling between a terminal device, a source base station and a target base station according to an embodiment.

An example of an embodiment in which traffic steering information is sent between base stations during or following a handover of the terminal device from a source base station to a target base station is illustrated by the signalling diagram of FIG. 7. This embodiment can be implemented in the scenario shown in FIG. 5. Apart from as described below, the handover of the terminal device from a source base station to a target base station is performed in a conventional manner, and the details will not be provided herein.

A terminal device 609 is initially served by a first (source) base station 601, indicated generally by signalling 801 in FIG. 7. When the terminal device 609 moves into the coverage area of a second (target) base station 605 a handover of the terminal device 609 from the source base station 601 to the target base station 605 is initiated. The source base station 601 informs the target base station 605 that a handover is required (signal 803).

As part of the handover procedure (or in some embodiments shortly after the handover procedure has been completed), the source base station 601 sends or forwards the traffic steering information applicable to the terminal device 609 to the target base station (signal 805). The handover procedure otherwise proceeds and is completed in a conventional manner with the terminal device 609 being informed by the source base station 601 that a handover is required (signal 807).

When the handover procedure is completed, the terminal device 609 is served by the target base station 605, as shown generally by signalling 809.

In some embodiments the traffic steering information (signal 807) can be forwarded over an interface between the source and target base stations. In an LTE network, the traffic steering information could, for example, be sent via the X2 interface which is a logical interface between base stations. In other embodiments, the traffic steering information (signal 807) could be forward from the source base station 601 to the target base station 605 via another network node, for example the mobility management entity (MME) in LTE or another core network node. In this case the traffic steering information could be carried in the Source to Target Transparent container.

In some embodiments the target base station 605 may send a request to the source base station 601 for the traffic steering information for the terminal device 609. This optional request is shown as signal 811 in FIG. 7. This request can, for example, be transmitted from the target base station 605 to the source base station 601 in a similar manner to the traffic steering information itself (e.g. via an interface between the nodes, such as an X2 interface, or via another network node). In some embodiments the request for the traffic steering information could, for example, be indicated with a flag in an existing message related to the handover procedure.

For example, as part of the handover procedure, the source base station 601 first sends a "HANDOVER REQUEST" message to the target base station 605, the target base station 605 replies with a "HANDOVER REQUEST ACKNOWLEDGE" message if the handover is accepted. A request for the traffic steering information by the target base station 605 (signal 811) could be sent by the target base station 605 to the source base station 601 in the "HANDOVER REQUEST ACKNOWLEDGE" message.

In the embodiments where the source base station 601 sends the traffic steering information without any request from the target base station 605 being required, then the traffic steering information can be sent in the "HANDOVER REQUEST" message.

Alternatively, in either approach, the traffic steering information and/or the request for traffic steering information (e.g. a flag in a message) can be sent in separate message(s) to the existing messages in the handover procedure, which can be sent at the same time as or shortly before or after the "HANDOVER REQUEST"/"HANDOVER REQUEST ACKNOWLEDGE" messages.

In some embodiments the request 811 for traffic steering information may be conditionally triggered. One condition can be the capability of the WLAN/3GPP radio interworking feature. For example, the sending of a request and the forwarding of the traffic steering information may only be performed if the base stations involved support the interworking feature. If the target base station 605 does not support the interworking feature, then no request will be sent and/or in any case there will be no transmission of the traffic steering information by the source base station 601. It will be appreciated that where a base station supports the WLAN/3GPP Radio interworking feature, this includes the feature currently being enabled in the cell.

Figure 8:
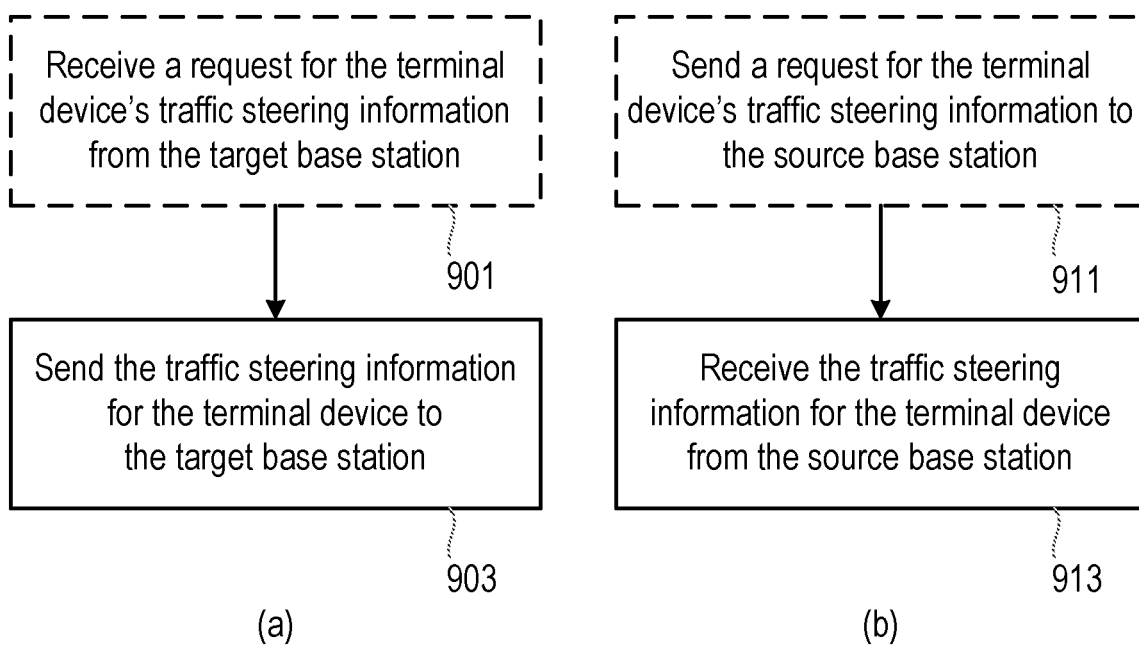
FIG. 8 shows two flow charts illustrating methods of operating a source base station and a target base station according to the embodiment of FIG. 7.

Methods of operating a source base station and a target base station according to the above embodiments are shown in FIGS. 8(a) and 8(b) respectively. In step 911 of FIG. 8(b), which as noted above is optional, the target base station 605 sends a request for the traffic steering information for an incoming terminal device 609 to the source base station 601.

This request is received by the source base station 601 in step 901 of FIG. 8(a). The source base station 601 then sends the traffic steering information for the terminal device 609 to the target base station 605 (step 903 in FIG. 8(a)). The traffic steering information is received by the target base station 605 in step 913 of FIG. 8(b).

As noted above, as well as obtaining traffic steering information during or following handover of a terminal device 609 to a target base station 605, the above embodiments are also applicable to the scenario when a terminal device transitions into a connected state from an idle state (as shown in FIG. 6). In this case, the base station to which the terminal device connects (i.e. the base station serving the terminal device when it enters the connected mode) receives the traffic steering information for the terminal device from the base station that the terminal device was last in a connected mode with. The methods shown in FIGS. 8(a) and 8(b) are applicable to this embodiment, with the method in the target base station (FIG. 8(b)) being performed by the base station 701d that serves the terminal device 705 when the terminal device 705 enters the connected mode, and the method in the source base station (FIG. 8(a)) being performed by the base station 701b that the terminal device 705 was last in the connected mode with (or the base station that provided the traffic steering information to the terminal device 705 prior to the base station 701b that the terminal device 705 was last in the connected mode with). In some embodiments, the identity of a base station to which the terminal device 705 was last connected to can be stored in a core network node (e.g. a mobility management entity, MME) and the base station 701d that serves the terminal device 705 when the terminal device 705 re-enters the connected mode can ask the core network node to identify which base station it should request or otherwise obtain the traffic steering information from.

Forwarding Traffic Steering Information from a Terminal Device

As an alternative to the above embodiments, in some embodiments of the techniques described herein the traffic steering information for a terminal device is sent from the terminal device to the base station currently serving the terminal device. This information can be sent by the terminal device during or following a handover to the base station, or when the terminal device transitions to a connected mode from an idle mode.

Figure 9:
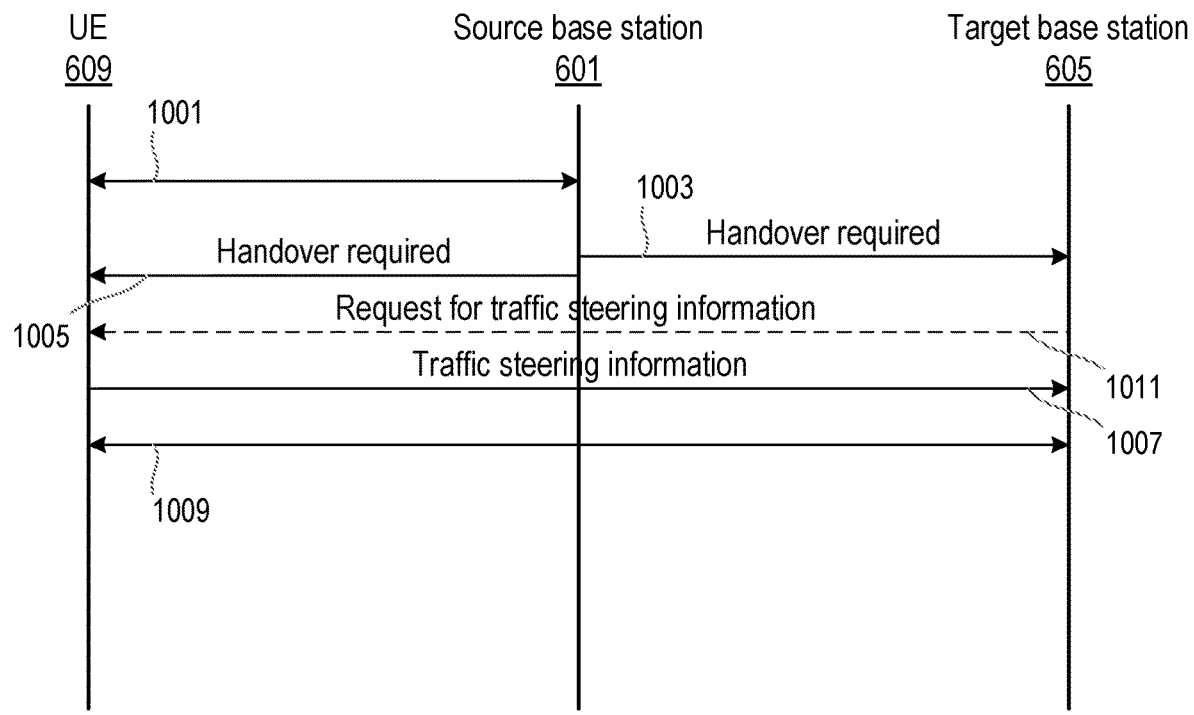
FIG. 9 is a signalling diagram illustrating the signalling between a terminal device, a source base station and a target base station according to another embodiment.

An example of an embodiment in which traffic steering information is sent from the terminal device to a base station during or following a handover of the terminal device from a source base station to a target base station is illustrated by the signalling diagram of FIG. 9. This embodiment can be implemented in the scenario shown in FIG. 5. Apart from as described below, the handover of the terminal device from a source base station to a target base station is performed in a conventional manner, and the details will not be provided herein.

A terminal device 609 is initially served by a first (source) base station 601, indicated generally by signalling 1001 in FIG. 9. When the terminal device 609 moves into the coverage area of a second (target) base station 605 a handover of the terminal device 609 from the source base station 601 to the target base station 605 is initiated. The source base station 601 informs the target base station 605 that a handover is required (signal 1003). If the handover is to proceed (e.g. if the target base station 605 accepts the handover request, the handover proceeds in a conventional manner with the terminal device 609 being informed by the source base station 601 that a handover is required (signal 1005).

As part of the handover procedure (or in some embodiments shortly after the handover procedure has been completed), the terminal device 609 sends or forwards the traffic steering information applicable to the terminal device 609 to the target base station (signal 1007). The handover procedure otherwise proceeds and is completed in a conventional manner.

In this embodiment, signal 1007 can be a radio resource control, RRC, message. For example, the RRC message can be the RRC CONNECTION RECONFIGURATION COMPLETE message, or an alternative (e.g. new) RRC message sent shortly after the RRC CONNECTION RECONFIGURATION COMPLETE message.

When the handover procedure is completed, the terminal device 609 is served by the target base station 605, as shown generally by signalling 1009.

In some embodiments, the sending of the traffic steering information by the terminal device 609 (signal 1007) is triggered by the terminal device 609, provided that the terminal device 609 has traffic steering information available.

Alternatively, the target base station 605 can trigger the transmission of the traffic steering information by the terminal device 609. In particular, in some embodiments the target base station 605 may send a request to the terminal device 609 for the traffic steering information for the terminal device 609. This optional request is shown as signal 1111 in FIG. 9.

In some embodiments the terminal device 609 can indicate to the target base station 605 that it has been configured with traffic steering information, and the target base station 605 can decide whether to send the request for the traffic steering information in response to this indication. For example, the terminal device 609 can indicate to the target base station 605 that it has been configured with traffic steering information using a flag or bit in the RRC CONNECTION RECONFIGURATION COMPLETE message, or another (e.g. new) RRC message.

In some embodiments, the traffic steering information sent from the terminal device 609 to the target base station 605 may differ from the traffic steering information the terminal device 605 has been configured with. For example, the terminal device 609 may have received traffic steering information from the source base station 601 that configures the terminal device 609 to keep particular bearers X and Y in the 3GPP network and not move these to WLAN. However if bearer Y no longer exists when the terminal device 609 should report the traffic steering information to the target base station 605, then the terminal device 609 may only indicate traffic steering information which is still/currently relevant, which could for example be that bearer X should be kept in the 3GPP network.

Figure 10:
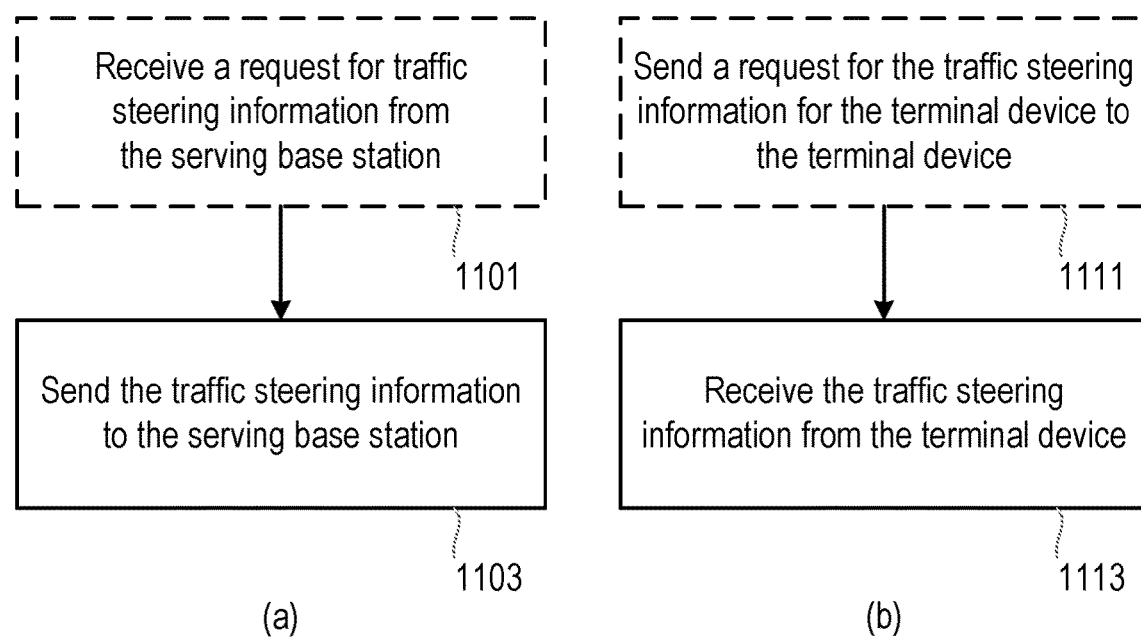
FIG. 10 shows two flow charts illustrating methods of operating a terminal device and a target base station according to the embodiment of FIG. 9.

Methods of operating a terminal device and a target base station according to the above embodiments are shown in FIGS. 10(a) and 10(b) respectively. In step 1111 of FIG. 10(b), which as noted above is optional, the target base station 605 sends a request for the traffic steering information for an incoming terminal device 609 to the terminal device 609.

This request is received by the terminal device 609 in step 1101 of FIG. 10(a). The terminal device 609 then sends the traffic steering information for the terminal device 609 to the target base station 605 (step 1103 in FIG. 10(a)). The traffic steering information is received by the target base station 605 in step 1113 of FIG. 10(b).

As noted above, as well as obtaining traffic steering information during or following handover of a terminal device 609 to a target base station 605, the above embodiments are also applicable to the scenario when a terminal device transitions into a connected state from an idle state (as shown in FIG. 6). In this case, the base station to which the terminal device connects (i.e. the base station serving the terminal device when it enters the connected mode) receives the traffic steering information for the terminal device from the terminal device. The methods shown in FIGS. 10(a) and 10(b) are applicable to this embodiment, with the method in the target base station (FIG. 10(b)) being performed by the base station 701d that serves the terminal device 705 when the terminal device 705 enters the connected mode.

Acknowledging Suitability of Traffic Steering Information

In further embodiments to those described above, after receiving the traffic steering information, the receiving (e.g. target) base station needs to determine whether the traffic steering information is suitable for use in that cell. If so, the target base station can acknowledge to the terminal device that the traffic steering information maintained by the terminal device can be used.

In some embodiments, the target base station can determine whether the traffic steering information is suitable for use in that cell based on load. If, for example, the terminal device moves from a cell with a high load where it may be suitable to offload all traffic to another RAT (e.g. WLAN) (with that suitability being represented in the traffic steering information used in that cell), to a cell with a low load where no (or only some) traffic should be offloaded to another RAT (e.g. WLAN) then the target base station may deem the traffic steering information for the high load cell unsuitable for use in its cell, or vice versa.

If the target base station considers terminal device's traffic steering information to be unsuitable, it could indicate this to the terminal device (either explicitly or implicitly, as described in more detail below) and the terminal device could discard the traffic steering information and/or stop acting according to the traffic steering information. Alternatively or in addition, the target base station can provide new traffic steering information to the terminal device if the traffic steering information currently maintained by the terminal device is not deemed suitable.

In one example, where the target base station receives the traffic steering information from the source base station during or following a handover, then the target base station can control whether the traffic steering information is suitable for use in the cell controlled by the target base station. If the traffic steering information is suitable then the target base station could indicate this, either implicitly or explicitly, to the terminal device.

In particular, the target base station could send an explicit indicator to the terminal device which is interpreted by the terminal device as indicating that the traffic steering information is suitable or not suitable (as appropriate). Such an indicator could be sent in an RRC message. The terminal device can then respond to the indicator by using the traffic steering information or discarding and/or stopping acting according to traffic steering information as appropriate.

Alternatively, it is possible for the suitability of the terminal device's traffic steering information to be implicitly indicated. For example, if the target base station does not provide new traffic steering information to the terminal device, the terminal device could interpret this to mean that the traffic steering information is deemed suitable.

In a further or alternative embodiment, the terminal device can be configured such that following a handover to a new base station and/or a transition to a connected mode the terminal device considers the traffic steering information it currently has available invalid until an indication (i.e. indicating that the traffic steering information is suitable or not suitable) has been received from the serving base station. In this case, prior to receiving the indication (implicitly or explicitly) from the base station, the terminal device could apply a default behaviour, which can be, for example, keeping all traffic in the 3GPP network.

In an alternative to the above, the terminal device can be configured such that following a handover to a new base station and/or a transition to a connected mode the terminal device considers the traffic steering information it currently has available valid as long as the target base station has not provided an indication to the contrary. For example a terminal device can connect to the target base station and the terminal device can apply the traffic steering information it maintains as long as the target base station does not, for example, provide an indication that the traffic steering information should not be used, and/or provide new traffic steering information.

Figure 11:
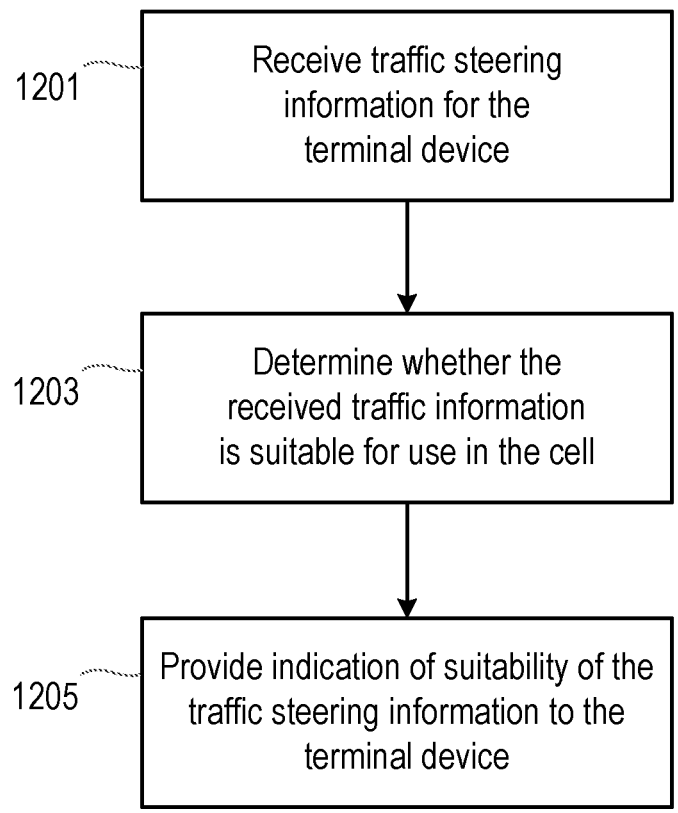
FIG. 11 is a flow chart illustrating a method of operating a base station according to a further embodiment.

A method of operating a network node (e.g. a base station) according to the above further embodiment is shown in FIG. 11. In a first step, step 1201, the base station receives traffic steering information for a terminal device that the base station is serving. As noted above, this traffic steering information can be provided from a base station that previously served the terminal device or from the terminal device itself.

In step 1203, the base station determines whether the received traffic steering information is suitable for use in the cell controlled by the base station. Then, in step 1205, the base station provides an indication of the suitability of the traffic steering information to the terminal device. As noted above, the indication can be provided explicitly (for example with an indication that the information is valid or invalid, or by sending new/replacement information in the event that the terminal device's information is unsuitable) or implicitly (for example through refraining from sending new or replacement traffic steering information to the terminal device).

The above techniques and embodiments therefore allow a base station to acquire traffic steering information (and/or access selection information and/or other information used by a terminal device in a network interworking feature) for a terminal device (or a group of terminal devices) when the terminal device moves from one cell to another or enters a connected mode or state from an idle mode or state. In some embodiments, providing the information to the base station allows the base station to evaluate whether the information is suitable for use in that cell, and if not suitable the base station can provide new information to the terminal device. Thus the above techniques and embodiments allow undesirable behaviour of a terminal device due to a network interworking feature to be prevented, which is important from a Radio Resource Management point of view.

It will be appreciated by the person of skill in the art that various modifications may be made to the above described embodiments without departing from the scope of the teaching of the present application. For example, it will be readily appreciated that although the above embodiments are described with reference to parts of a 3GPP network, embodiments will also be applicable to like networks, such as a successor of any current 3GPP network, having like functional components. Therefore, in particular, the terms 3GPP and associated or related terms used in the above description and in the enclosed drawings now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the present techniques can be implemented in other ways than those specifically set forth herein, without departing from essential characteristics of the teaching of this application. The present embodiments are thus to be considered in all respects as illustrative and not restrictive.

The invention claimed is:

1. A method in a target base station that is operating according to a first radio access technology (RAT), the target base station controlling a first cell in a first network, the method comprising:
   the target base station receiving a handover message for a terminal device, the handover message indicating a request to handover the terminal device from a source base station to the target base station, wherein the source base station is also operating according to the first RAT;
   after receiving the handover message for the terminal device, the target base station obtaining access network selection information for use by the terminal device in performing one or both of access network selection and traffic steering, wherein the access network selection information was provided to the terminal device from the source base station or another base station;
   the target base station determining whether or not the terminal device should continue to use the access network selection information while the terminal device is being served by the target base station; and
   after performing the determining step, the target base station providing to the terminal device an indication that indicates one of: 1) that the target base station has determined that the terminal device should continue to use the access network selection information while the terminal device is being served by the target base station or 2) that the target base station has determined that the terminal device should not continue to use the access network selection information while the terminal device is being served by the target base station.

2. The method as defined in claim 1, wherein the handover message indicating the request to handover the terminal device from the source base station to the target base station comprises the access network selection information.

3. The method as defined in claim 2, wherein the step of receiving comprises receiving the handover message over an interface between the source base station and the target base station.

4. The method as defined in claim 3, wherein the interface is an X2 interface.

5. The method of claim 1, comprising the target base station transmitting to the terminal device a message comprising an indication that indicates that the terminal device should continue to use the access network selection information, wherein the target base station transmits the message as a result determining that the terminal device should continue to use the access network selection information while the terminal device is being served by the target base station.

6. The method of claim 1, wherein obtaining the access network selection information comprises:
   the target base station, after receiving the handover message, transmitting to the source base station a request for the access network selection information; and
   the target base station receiving a response message transmitted by the source base station as a response to the request, wherein the response message comprises the access network selection information.

7. The method of claim 1, wherein obtaining the access network selection information comprises:
   the target base station, after receiving the handover message, transmitting to the terminal device a request for the access network selection information; and
   the target base station receiving a response message transmitted by the terminal device as a response to the request, wherein the response message comprises the access network selection information.

8. A network node for use in a first network that is operating according to a first radio access technology (RAT), the network node supporting a network interworking feature that enables and controls interworking between the first network and a network operating according to a second RAT, the network node controlling a first cell in the first network, the network node comprising:
   interface circuitry; and
   a processing circuit configured to:
   receive a handover message for a terminal device, the handover message indicating a request to handover the terminal device from a source base station to the network node;
   obtain access network selection information for use by the terminal device in performing one or both of access network selection and traffic steering after receiving the handover message for the terminal device, wherein the access network selection information was provided to the terminal device from the source base station or another base station;
   determine whether or not the terminal device should continue to use the access network selection information while the terminal device is being served by the target base station; and
   provide to the terminal device an indication that indicates one of: 1) that the target base station has determined that the terminal device should continue to use the access network selection information while the terminal device is being served by the target base station and 2) that the target base station has determined that the terminal device should not continue to use the access network selection information while the terminal device is being served by the target base station, wherein the source base station is configured to operate according to the first RAT, and the network node is configured to operate according to the first RAT.

9. The network node as defined in claim 8, wherein handover message comprises the access network selection information.

10. The network node as defined in claim 9, wherein the network node receives the handover message via an interface between the source base station and network node.

11. The network node as defined in claim 10, wherein the interface is an X2 interface.

12. A method in a source base station in a first network that is operating according to a first radio access technology (RAT), the method comprising:

the source base station determining whether a handover message for a terminal served by the source base station should be sent to a target base station;

the source base station, after determining that the handover message for the terminal should be sent to the target base station, providing to the target base station access network selection information for use by the terminal in performing one or both of access network selection and traffic steering; and as a result of determining that the handover message for the terminal should be sent to the target base station, the source base station sending to the target base station the handover message, wherein the handover message indicates a request to handover the terminal device from the source base station to the target base station, wherein the source base station is operating according to the first RAT, and the target base station is operating according to the first RAT.

13. The method as defined in claim 12, wherein the step of providing the access network selection information to the target base station comprises including the access network selection information in the handover over message.

14. The method as defined in claim 12, wherein the step of providing the access network selection information to the target base station comprises transmitting the access network selection information to the target base station in response to a request transmitted by the target base station.

15. The method as defined in claim 14, wherein the request transmitted by the target base station is an X2 interface request.

16. The method as defined in claim 12, wherein the access network selection information comprises traffic steering information that indicates that traffic having a particular quality of service (QoS) requirement should be routed over a particular RAT.

17. A source base station for use in a first network that is operating according to a first radio access technology (RAT), the source base station supporting a network interworking feature that enables and controls interworking between the first network and a network operating according to a second RAT, the source base station comprising:

interface circuitry; and a processing circuit configured to:

determine whether a handover message for a terminal served by the source base station should be sent to a target base station;

after determining that the handover message for the terminal should be sent to the target base station, provide to the target base station access network selection information for use by the terminal in performing one or both of access network selection and traffic steering; and send to the target base station the handover message as a result of determining that the handover message for the terminal should be sent to the target base station, wherein the handover message indicates a request to handover the terminal device from the source base station to the target base station, wherein the source base station is configured to operate according to the first RAT, and the target base station is configured to operate according to the first RAT.

18. The source base station of claim 17, wherein the source base station is configured to provide the access network selection information to the target base station by including the access network selection information in the handover over message sent to the target base station.

19. The source base station of claim 17, wherein the source base station is configured to provide the access network selection information to the target base station by transmitting the access network selection information to the target base station in response to a request transmitted by the target base station.

20. The source base station of claim 17, wherein the request transmitted by the target base station is an X2 interface request.

21. A method of operating a terminal device in a first network that is operating according to a first radio access technology (RAT), the terminal device supporting and operating according to a network interworking feature that enables and controls interworking between the first network and a network operating according to a second RAT, the method comprising:

the terminal device sending access network selection information for the terminal device to a network node controlling a first cell in the first network, the access network selection information having been previously used by the terminal device in another cell in the first network, wherein the access network selection information being for use in performing one or both of access network selection and traffic steering; and the terminal device receiving from the network node an indication of the suitability of the access network selection information.

22. The method as defined in claim 21, the method further comprising the step of:

receiving a request for the access network selection information from the network node that is controlling the first cell.

23. The method as defined in claim 21, the method further comprising the step of:

discarding the access network selection information and/or ceasing to act according to the access network selection information if the received indication indicates that the access network selection information is unsuitable.

24. The method as defined in claim 21, wherein the step of receiving an indication of the suitability of the access network selection comprises receiving an explicit indication from the network node indicating the suitability of the access network selection information.

25. A terminal device for use in a first network that is operating according to a first radio access technology (RAT), the terminal device supporting and operating according to a network interworking feature that enables and controls interworking between the first network and a network operating according to a second RAT, the terminal device comprising:
  transceiver circuitry; and
  a processing circuit configured to:
    employ the transceiver circuitry to send access network selection information for the terminal device to a network node controlling a first cell in the first network, the access network selection information having been previously used by the terminal device in another cell in the first network in performing one or both of access network selection and traffic steering; and
    determine whether the network node has provided to the terminal device an indication of the suitability of the access network selection information.

26. The terminal device as defined in claim 25, wherein the processing circuit is configured to receive via the transceiver circuitry a request for the access network selection information from the network node that is controlling the first cell.

27. The terminal device as defined in claim 25, wherein the processing circuit and transceiver circuitry are configured to send the access network selection information during or following hand-in of the terminal device to the first cell from another cell in the first network.

28. The terminal device as defined in claim 25, wherein the processing circuit and transceiver circuitry are configured to send the access network selection information following a transition of the terminal device from an idle mode to a connected mode.

29. The terminal device of claim 25, wherein the terminal device is configured to use the access network selection information in response to the processor determining that the network node has provided an indication indicating that the terminal device should use the access network selection information while the terminal device is being served by the network node.

30. The terminal device of claim 29, wherein the access network selection information comprises at least one of: i) a reference signal received power (RSRP) threshold value and a received channel power indicator (RCPI) threshold value.

* * * * *